(12) United States Patent
Zaw

(10) Patent No.: US 10,116,684 B2
(45) Date of Patent: *Oct. 30, 2018

(54) AUTOMATICALLY DETECTING AND CORRECTING MISSING AND MISCONFIGURED SECURITY ATTRIBUTES

(71) Applicant: Verizon Digital Media Services Inc., Dulles, VA (US)

(72) Inventor: Tin Zaw, Los Angeles, CA (US)

(73) Assignee: VERIZON DIGITAL MEDIA SERVICES INC., Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/697,303

(22) Filed: Sep. 6, 2017

(65) Prior Publication Data

US 2017/0366573 A1 Dec. 21, 2017

Related U.S. Application Data

(63) Continuation of application No. 14/814,755, filed on Jul. 31, 2015, now Pat. No. 9,762,604.

(51) Int. Cl.
*H04L 29/06* (2006.01)
*H04L 29/08* (2006.01)

(52) U.S. Cl.
CPC ........ *H04L 63/1433* (2013.01); *H04L 63/105* (2013.01); *H04L 63/20* (2013.01); *H04L 67/02* (2013.01); *H04L 2212/00* (2013.01)

(58) Field of Classification Search
CPC ....... H04L 63/10; H04L 63/105; H04L 63/16; H04L 63/20; G06F 21/10; G06F 21/125; G06F 21/60
See application file for complete search history.

(56) References Cited

U.S. PATENT DOCUMENTS 9,106,661 B1 * 8/2015 Stamos ................... H04L 63/10
2016/0094575 A1 * 3/2016 Shekyan ............. H04L 63/1433
726/25

* cited by examiner

*Primary Examiner* — Edward Zee
(74) *Attorney, Agent, or Firm* — Ansari Katiraei LLP; Arman Katiraei; Sadiq Ansari

(57) ABSTRACT

Some embodiments provide automated and intelligent security configuration at the network edge. A server tasked with distributing content provider content automatically detects and modifies attributes in the content provider content in order to close potential security vulnerabilities prior to redistributing that content on behalf of the content provider to different recipients. The vulnerabilities can arise from the content provider misconfiguring attributes or omitting certain security attributes when creating the content. The server can provide a default or customized set of protections, wherein the customized protections are specific to each content provider or the content of each content provider.

17 Claims, 5 Drawing Sheets

AUTOMATICALLY DETECTING AND CORRECTING MISSING AND MISCONFIGURED SECURITY ATTRIBUTES

CLAIM OF BENEFIT TO RELATED APPLICATIONS

This application is a continuation of U.S. nonprovisional application Ser. No. 14/814,755 entitled "Automatically Detecting and Correcting Missing and Misconfigured Security Attributes", filed Jul. 31, 2015. The contents of application Ser. No. 14/814,755 are hereby incorporated by reference.

TECHNICAL FIELD

The present invention relates to network security.

BACKGROUND ART

Much of the digital content we consume is delivered by content delivery networks (CDNs), cloud hosting sites, and the like. Content providers create the content and pass the content to the CDN for optimized delivery to end users located throughout the world. Using a CDN allows a content provider to focus on content creation. The CDN manages the infrastructure and capacity used to deliver content provider content to users all over the world. CDNs provide other benefits including optimizing the delivery of content provider content while providing some level of security and protection against attack.

Optimized content delivery is based primarily on the CDN distribution infrastructure. CDNs deploy points-of-presence (PoPs) at different geographic regions. Each PoP typically includes multiple servers that serve different content provider content to end users located closest to the PoP. By reducing the geographic distance between the end user and where the content is located, end users are able to receive the content with less latency, packet loss, potential for network failure, etc. Other optimizations performed by the CDN include compressing content provider content before distribution and passing a version of content that is optimal for the end user device as determined from the device's screen resolution, network bandwidth, processing power, memory, etc.

CDN security is provided in the form of web application firewalls (WAFs). A WAF is a distributed firewall that the CDN invokes at each PoP where content provider content is accessible. The WAF detects and prevents various attacks directed to content provider content served by the CDN.

However, CDN security does not protect a content provider from security vulnerabilities that are present in the content provider's own content. For example, if the content provider's content is passed without encryption, then the CDN cannot prevent that content from being intercepted. Some such vulnerabilities arise because the content provider misconfigures or improperly sets security attributes that control how the content provider content is delivered, protected, or can be accessed or used by a recipient. Such issues can happen accidentally or because the content provider is unfamiliar with the available security attributes or does not know to properly configure or set the attributes for their own content. With the exception of some of the optimizations described above, the CDN passes content provider content as is. Accordingly, any security weaknesses and vulnerabilities that are inherent in the content provider content will be exposed to the end user receiving the content, allowing the end user to exploit those weaknesses and vulnerabilities if desired.

There is therefore a need to improve CDN security by addressing issues originating from within the content provider content. Specifically, there is a need for the CDN to correct misconfigurations and improperly set security attributes in the content provider content.

BRIEF DESCRIPTION OF THE DRAWINGS

A preferred embodiment of methods and systems for automatically detecting and correcting missing and misconfigured security attributes will now be described, by way of example only, with reference to the accompanying drawings in which.

DETAILED DESCRIPTION

Some embodiments provide automated and intelligent security configuration at the network edge. Some such embodiments involve a distribution server automatically detecting and modifying attributes in content obtained from a content provider prior to redistributing that content on behalf of the content provider to different recipients. The modifications correct and close the door on security vulnerabilities that result from the content provider misconfiguring or improperly setting security attributes that control how the content is delivered, protected, or can be accessed or used by a recipient.

In some embodiments, the distribution server modifies header attributes for packets encapsulating the content provider content. The distribution server modifies misconfigured or improperly set attributes within the packet headers that create various security vulnerabilities. Some embodiments involve modifying any one or more of the following Hypertext Transfer Protocol (HTTP) security attributes: (1) Access-Control-Allow-Origin, (2) Content-Security-Policy (CSP), (3) Cross Domain Meta Policy, (4) X-Content-Type-Options, (5) Server Information, (6) HTTP Strict-Transport-Security (HSTS), (6) UTF-8, (7) X-Frame-Options, (8) X-Powered-By, and (9) X-XSS-Protection. Some embodiments further involve modifying HTTP Set-Cookie attribute. Although the discussion will focus on these HTTP based security attributes as they are the most commonly used security attributes, it should be evident that the embodiments can be extended to modify security attributes of other network protocols.

Figure 1:
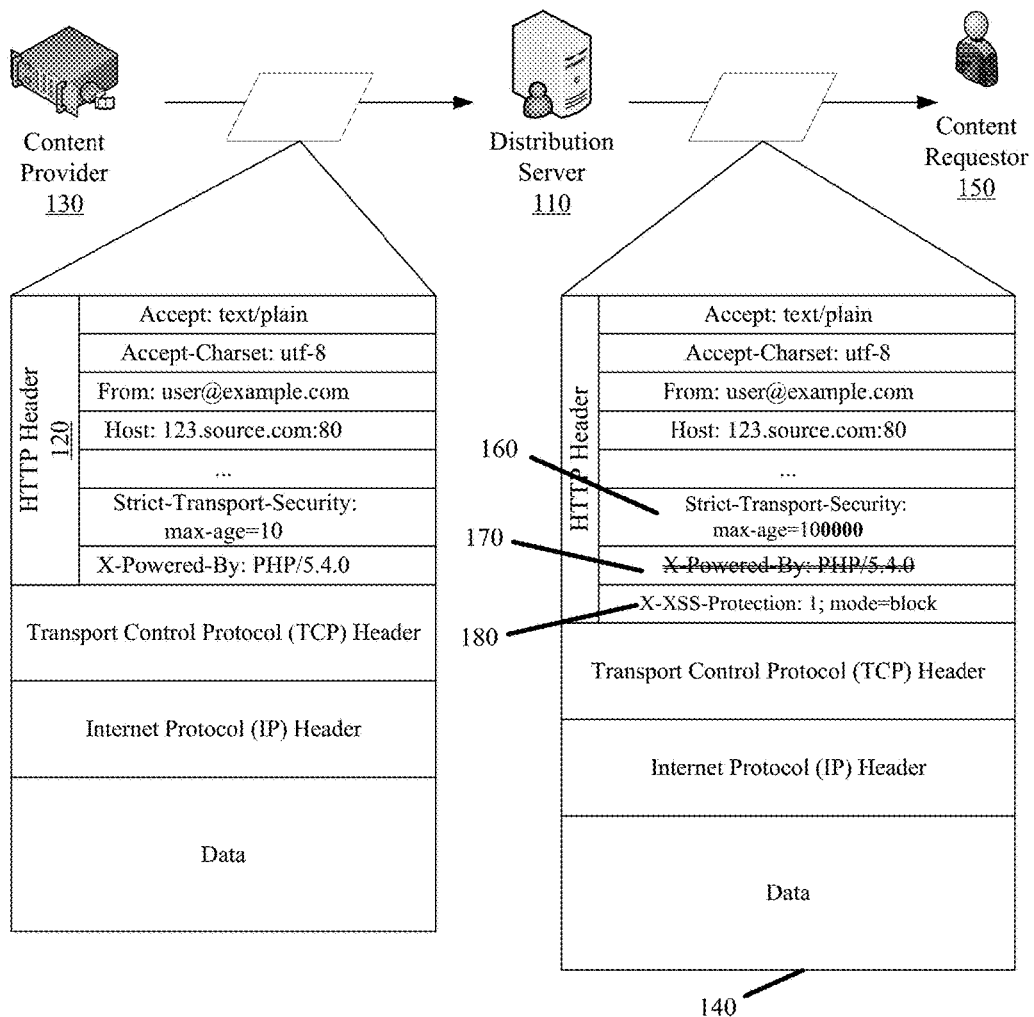
FIG. 1 illustrates a distribution server automatically modifying security attributes for content provider content before sending the content to an end user in accordance with some embodiments.

FIG. 1 illustrates a distribution server 110 automatically modifying security attributes for content provider content before sending the content to an end user in accordance with some embodiments. The figure conceptually illustrates HTTP attributes 120 specified in a packet that the distribution server 110 receives from a content provider 130. The figure also illustrates how the distribution server 110 modifies some of the HTTP security attributes to create a modified packet 140 that is sent to recipient 150. As shown, the distribution server 110 modifies the HTTP attributes by changing the value that was configured for the HSTS attribute 160, removing the X-Powered-By attribute 170, and introducing and setting a value for the X-XSS-Protection attribute 180 in the packet header.

In some embodiments, a default set of security policies guide the distribution server modifications. In the context of a content delivery network (CDN) or other cloud content provider, the CDN may provide a base level of security for all content provider content served by the CDN distribution servers. For example, the CDN may require that all connections established with the distribution server be secure even if various content providers allow for unsecure connections. In this example, the distribution server defines a default security policy requiring that all content provider content served from the distribution server have the HSTS security parameter set. In some such embodiments, the CDN or CDN security administrator configures the default set of security policies that control what security attributes the distribution server sets for content distributed by that distribution server.

In some embodiments, each content provider defines a custom set of security policies that control what security attributes are set by the distribution server prior to the distribution server sending that content provider's content to different recipients. As will be demonstrated below, setting the custom set of security policies for the distribution server to automatically configure is easier than manually configuring the content provider content with the desired set of security attributes. For example, when the content provider does not know how to manually configure the security attributes or is unaware of various security attributes or what they do, the distribution server can assist the content provider in configuring its security policies.

Figure 2:
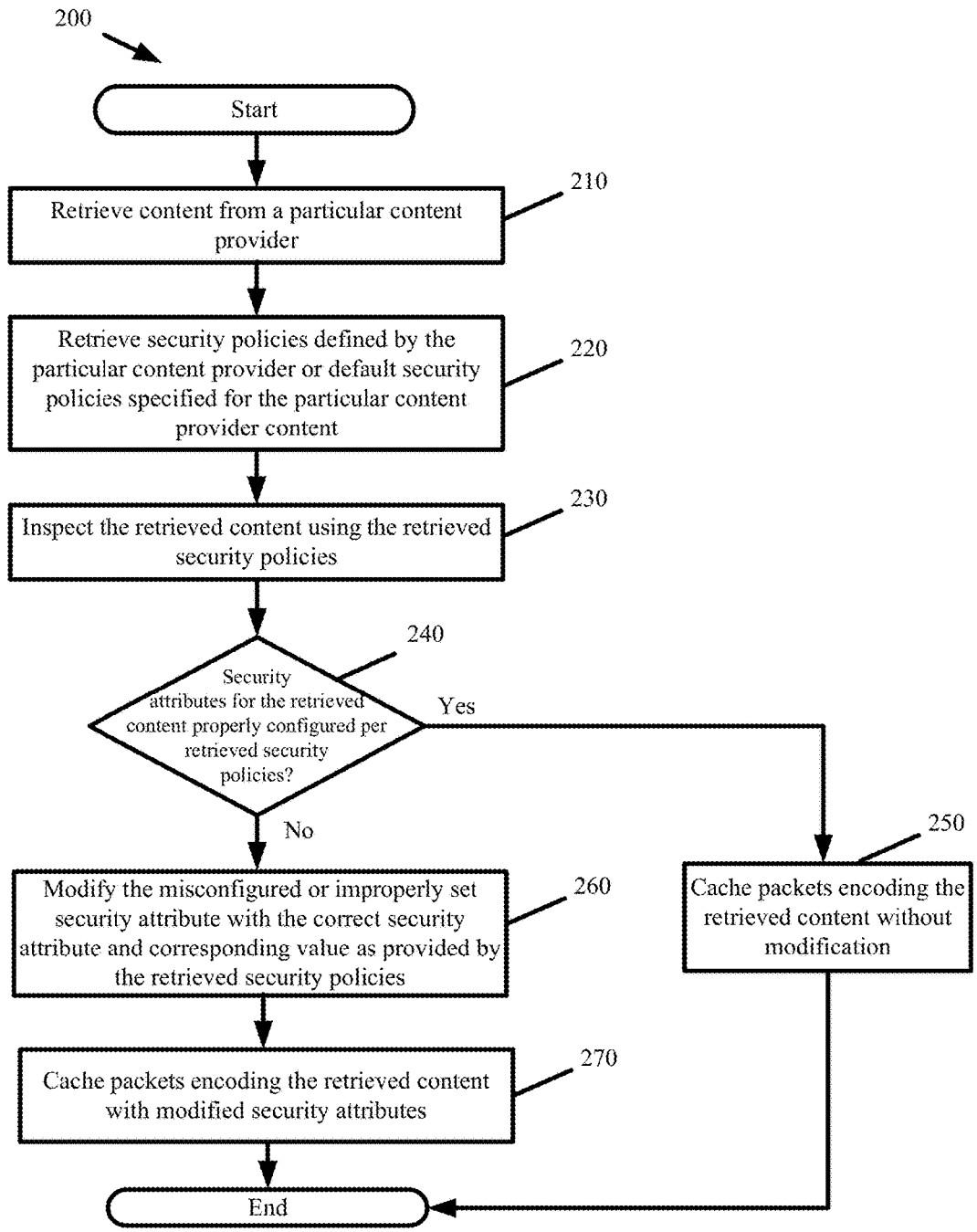
FIG. 2 presents a process for automatically detecting and correcting missing and misconfigured security attributes in accordance with some embodiments.

FIG. 2 presents a process 200 for automatically detecting and correcting missing and misconfigured security attributes in accordance with some embodiments. Process 200 is performed by a distribution server or any server obtaining content provider content and distributing that content to different recipients.

Process 200 begins with the distribution server retrieving (at 210) content from a particular content provider. The content retrieval may be initiated in response to the distribution server receiving a request for the particular content provider content and the distribution server not having a locally cached copy of the content. The content retrieval may also be initiated when the content provider modifies the content in some way and the distribution server retrieves the updated copy in order to refresh its cache. Content retrieval can proceed with the distribution server passing an HTTP GET request message to the content provider server hosting the desired content. In some embodiments, the content provider pushes the content directly to the distribution server whenever the content is updated or changed in order to update the distribution server cache.

The process also retrieves (at 220) security policies defined by the particular content provider or default security policies specified for the particular content provider content. In the context of a CDN, the content provider defined security policies are centrally stored in a database that the distribution server can access. Using a content provider identifier, such as the content provider domain name or Internet Protocol (IP) address, the distribution server is able to retrieve the correct set of security policies defined by the content provider.

The process inspects (at 230) the retrieved content using the retrieved security policies. In performing the inspection, the process detects (at 240) whether the security attributes for the retrieved content are properly configured as defined by the retrieved security policies. Specifically, the distribution server inspects the headers of the packets encapsulating some or all of the retrieved content in order to determine whether security attributes in each packet header is configured to match the retrieved security policies.

When the security attributes of the retrieved content packets are properly configured and match the retrieved security policies, the process caches (at 250) the packets encoding the retrieved content without modification. However, when at least one security attribute of the retrieved content packets is misconfigured or not set to match the retrieved security policies, the process modifies (at 260) the misconfigured or improperly set security attribute with the correct security attribute and corresponding value as provided by the retrieved security policies. The process then caches (at 270) the modified packets. Thereafter, the distribution server can respond to any requests for the particular content provider content by serving the cached copy of the content, wherein the cached copy has the security attributes configured or set according to the security policy even when the original content does not.

Process 200 can be varied such that the content provider content modification occurs in real-time when responding to user requests for content provider content. In such cases, the distribution server receives a request for content provider content that is not stored locally in cache. The distribution server retrieves an original copy of the content from the content provider or other origin server. The distribution server modifies the security attributes of the content according to security policies defined for the content before responding to the received request with the modified content. Contemporaneous with or subsequent to responding to the user request, the distribution server may then cache a copy of the modified content for use in responding to subsequent requests for that content.

Some embodiments provide an interactive interface to assist content providers in defining security policies used by the distribution server in modifying the content provider content. The interface serves multiple purposes. The interface first informs the content provider of the available security attributes. In some embodiments, the interface provides an explanation of each security attribute, the security attribute parameters, and the vulnerabilities that the attribute can address. This is especially helpful for content providers with little knowledge of network security. The interface also makes configuring or setting the security attributes as simple as toggling a switch. Once the switch is toggled on for a particular security attribute, the distribution server automatically performs the header modifications needed to set the particular security attribute in the content provider content. In contrast, to manually configure the security attribute, the content provider would need to alter the protocol stack encapsulating the content into network addressable packets so that the security parameter is set. This manual modification requires the content provider to have at least coding, HTTP protocol, and network security knowledge, all of which can be avoided by deferring to the distribution server and using the interface some embodiments.

Figure 3:
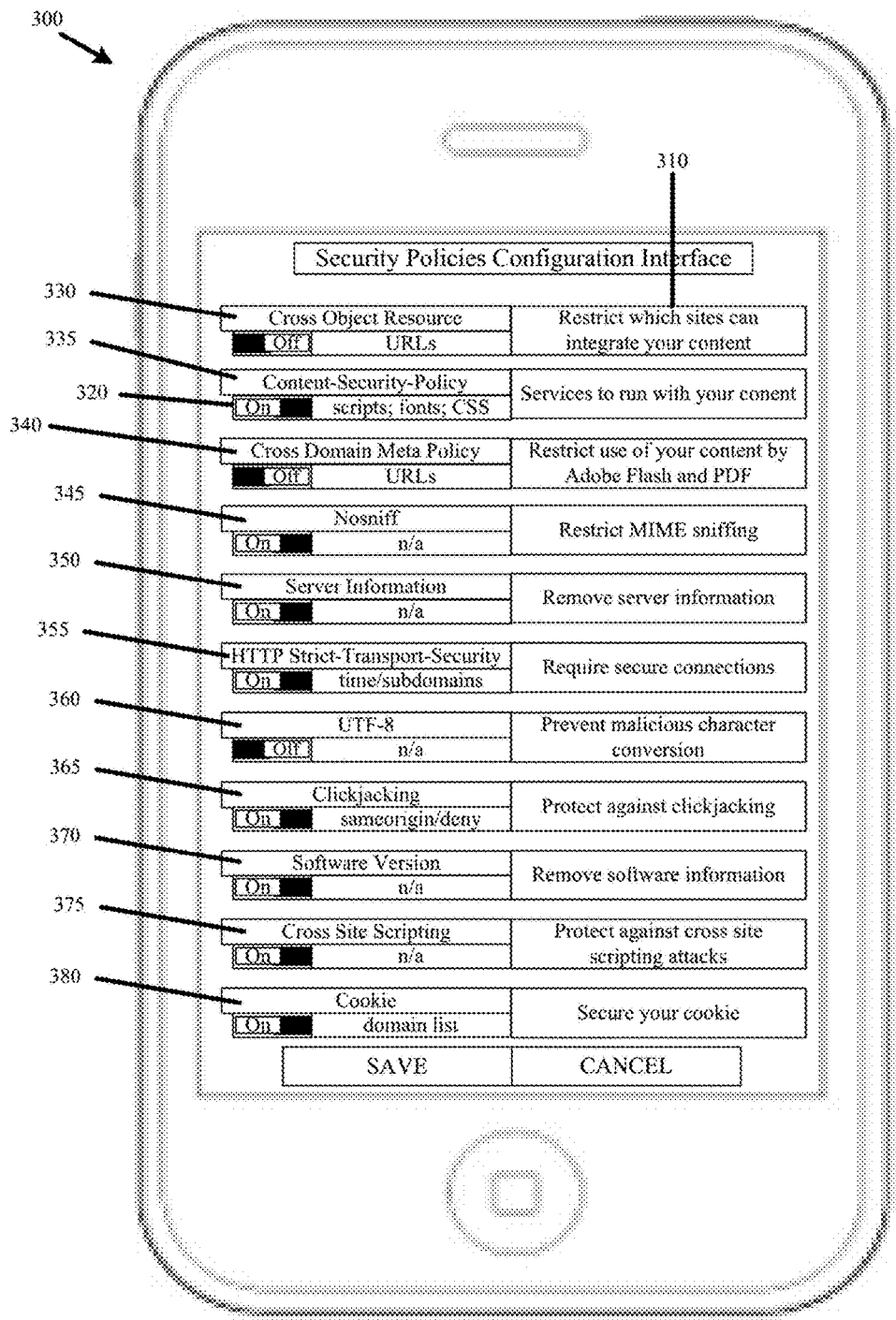
FIG. 3 illustrates the interactive interface for defining security policies with which the distribution server automatically detects and corrects misconfigured or improperly set security attributes.

FIG. 3 illustrates the interactive interface 300 for defining security policies with which the distribution server automatically detects and corrects misconfigured or improperly set security attributes. In some embodiments, the interface 300 is a graphical user interface (GUI) that content providers and other users can access remotely using a web browser or other application on a device with network connectivity. In some embodiments, the GUI is reachable by a particular Uniform Resource Locator (URL). Access to the interface 300 may be restricted to content providers that are authenticated using login credentials. The login credentials allow the distribution server or CDN to identify which content provider is using the interface 300 to configure security policies, and therefore which content the distribution server should apply the configured security policies to.

The interface 300 lists different security policies that the distribution server can automatically detect and configure or set. The interface 300 provides a description (column 310) to inform the user of the security policy purpose and the vulnerabilities that can be closed by enabling the security policy. The interface 300 further provides an interactive toggle (e.g., 320) which can be used to enable or disable the distribution server detection and correction of any of the listed security policies. An input field is provided adjacent to some security policies. The input field is used to configure one or more security policy parameter.

The security policy list presented in FIG. 3 includes: (1) Cross Object Resource Sharing (CORS) 330, (2) CSP 335, (3) Cross Domain Meta Policy 340, (4) Nosniff 345, (5) Server Information 350, (6) HSTS 355, (6) UTF-8 360, (7) Clickjacking 365, (8) Software Version 370, (9) Cross Site Scripting 375, and (10) Cookie 380.

In some embodiments, enabling the CORS security policy 330 configures the distribution server to detect and set the "Access-Control-Allow-Origin: _____" security attribute. This security policy restricts which sites are permitted to integrate the content provider's content. The input field allows the content provider to enumerate URLs of sites that are permitted to integrate the content provider's content.

In some embodiments, enabling the CSP security policy 335 configures the distribution server to detect and set the "Content-Security-Policy: _____ '_____'" security attribute. The security policy enumerates a list of scripts, media, stylesheets, images, fonts, plugins, audio and video, loading frame, etc. that the recipient is permitted to run with the content provider content. Using the input field, the content provider can define URLs for valid sources of JavaScript, stylesheets, images, fonts, plugins, audio and video, loading frames, etc.

In some embodiments, enabling the Cross Domain Meta Policy security policy 340 configures the distribution server to detect and set the "X-Permitted-Cross-Domain-Policies: _____" security attribute. This security policy can be used to prevent the unauthorized use of the content provider's content in Adobe Flash files and PDF files.

In some embodiments, enabling the Nosniff security policy 345 configures the distribution server to detect and set the "X-Content-Type-Options: nosniff" security attribute. This security policy prevents the recipient from Multipurpose Internet Mail Extensions (MIME) sniffing. In other words, it prevents the recipient from guessing the type of content that may be found in a file.

In some embodiments, enabling the Server Information security policy 350 configures the distribution server to detect and remove the references to the server type and version from the content provider content. This security policy causes the distribution server to remove the HTTP header "Server: " reference (e.g., "Server: Apache/2.2.17"). Providing the server type and version information can assist an attacker in identifying vulnerabilities of the content provider.

In some embodiments, enabling the HSTS security policy 355 configures the distribution server to detect and set the "Strict-Transport-Security: max-age=_____; includeSubDomains" security attribute. This security policy causes the recipient to establish a secure connection via HTTP Secure (HTTPS) with the distribution server when requesting the content provider content from the distribution server. This ensures that communications between the distribution server and the recipient are encrypted. Using the input field, the content provider can define the duration the security policy remains in effect.

In some embodiments, enabling the UTF-8 security policy 360 configures the distribution server to detect and set the "Accept-Charset: utf-8" security attribute. This security policy minimizes the likelihood that malicious character conversion could happen to the content provider content.

In some embodiments, enabling the Clickjacking security policy 365 configures the distribution server to detect and set the "X-Frame-Options: sameorigin/deny" security attribute. This security policy provides the content provider clickjacking protection by preventing another from placing a frame that invisibly renders the content provider content over some other content.

In some embodiments, enabling the Software Version security policy 370 configures the distribution server to detect and remove the HTTP header "X-Powered-By:" reference. Like the Server Information security policy, this security policy removes extraneous information from the HTTP header that can be used by attackers to identify vulnerabilities of the content provider and content provider content.

In some embodiments, enabling the Cross Site Scripting security policy 375 configures the distribution server to detect and set the "X-XSS-Protection: 1; mode=block" security attribute. This security policy prevents cross site scripting attacks by blocking malicious scripts when an attack is identified in a cross-site request and is replayed in a server response.

In some embodiments, enabling the Cookie security policy 380 configures the distribution server to detect and set the "Set-Cookie: Domain=_____; HttpOnly" security attribute. This security policy prevents unauthorized access to cookies used in conjunction with the content provider content. The domain parameter can be substituted or included with the path parameter so that the cookie cannot be accessed by sites other than those of the content provider. The HttpOnly flag prevents JavaScript access to the content of the cookie. In some embodiments, the enabling the Cookie security policy 380 also automatically enables the HSTS security policy 355 to ensure that the cookie is encrypted when passed between a user and the distribution server.

The security policies configured by the content provider are conveyed to the distribution server in a file format. The distribution server modifies its internal operation accordingly. In some embodiments, the distribution server includes a packet inspection module. The packet inspection module accesses the distribution server protocol stack in order to examine the headers of any incoming and outgoing packets. The packet inspection module refers to default set of security policies or those configured by a particular content provider whose content the distribution server is currently accessing in order to determine what, if any, modifications should be made to the packet header. Specifically, based on IP addressing, domain name, or URL information in a packet header, the packet inspection module can determine the content provider originating the packet being inspected, and thereby retrieve the security policies configured by that content provider. The packet inspection can then directly modify the packet header before reinserting the modified packet back into the protocol stack.

In some embodiments, the packet inspection module intercepts packets as they are received by the distribution server network interface before the packets enter the protocol stack. The packet inspection module examines the packet header and makes any modifications before passing the packet to the protocol stack.

The distribution server performing the automatic detecting and correcting of missing and misconfigured security attributes in accordance with the embodiments presented herein can be any specialized machine that serves content of one or more content providers to different recipients. The distribution server is specialized in the sense that it is optimized for responding to content requests. The distribution server contains memory that is used to cache the content provider content so that the content can be served to different recipients after only one retrieval from the content provider origin. The distribution server is also a specialized machine by virtue of the security attribute and header modifications it performs prior to serving or caching the content provider content. Although the distribution server can be an independent operating machine, in most applications, the distribution server operates in tandem with other distribution servers as part of a CDN or other cloud delivery or hosting platform that offers delivery of content provider content from multiple points-of-presence (PoPs) where different distribution servers are located.

Figure 4:
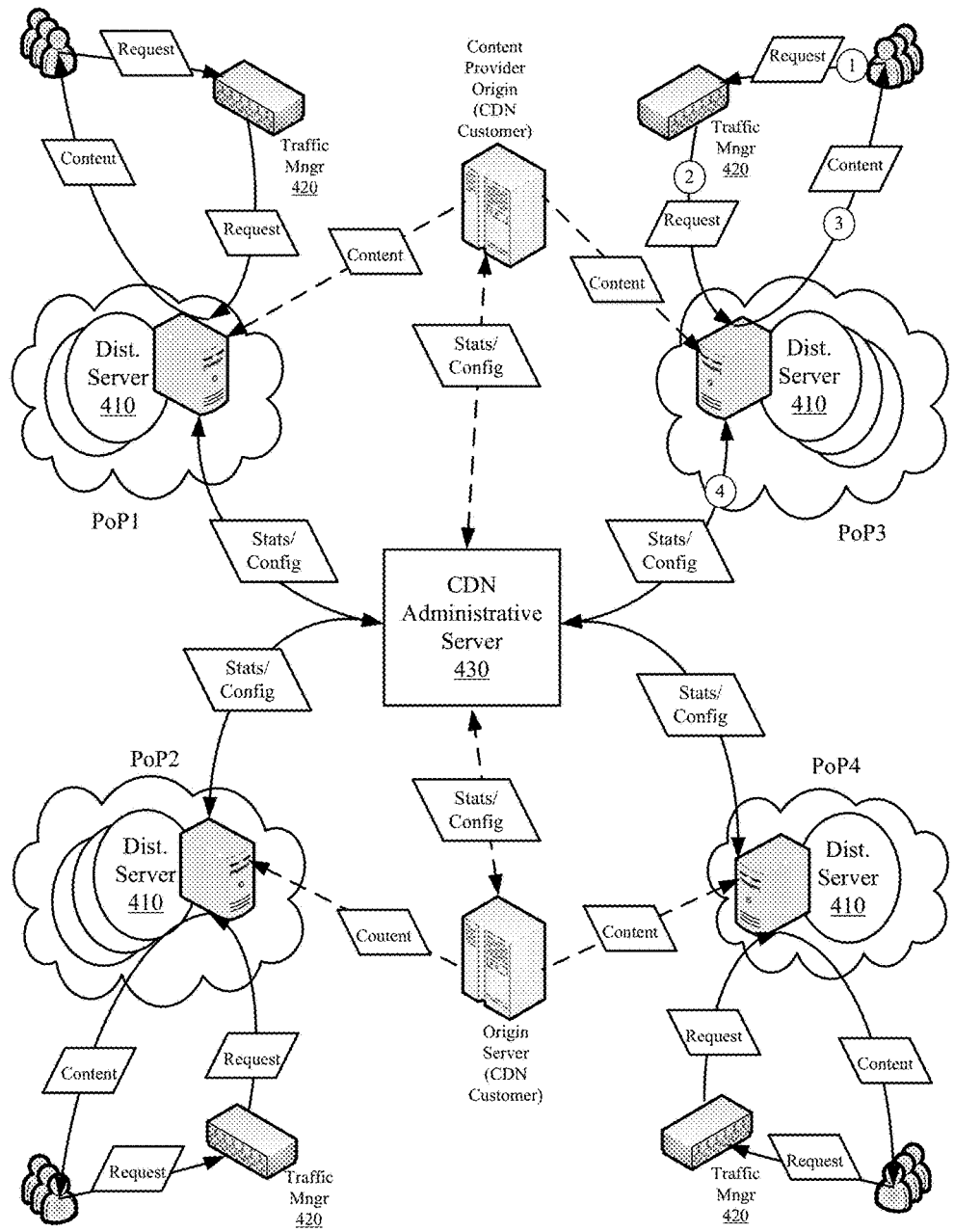
FIG. 4 presents an exemplary CDN architecture operating with several distribution servers performing the automatic detecting and correcting of missing and misconfigured security attributes in accordance with some embodiments.

FIG. 4 presents an exemplary CDN architecture operating with several distribution servers performing the automatic detecting and correcting of missing and misconfigured security attributes in accordance with some embodiments. The architecture includes a distributed set of distribution servers 410, traffic management servers 420, and an administrative server 430. The figure also illustrates the interactions that CDN customers including content providers have with the CDN and interactions that content consumers or end users have with the CDN.

Each distribution server of the set of distribution servers 410 may represent a single physical machine or a cluster of machines that serves content on behalf of different content providers to end users while also automatically detecting and modifying security attributes for the content being served. The cluster of machines may include a server farm for a geographically proximate set of physically separate machines or a set of virtual machines that execute over partitioned sets of resources of one or more physically separate machines. The set of distribution servers 410 are distributed across different network edges of the Internet to facilitate the "last mile" delivery of content. Each cluster of servers at a particular network edge may represent a CDN PoP, wherein an end user is typically routed to the closest PoP in order to download content from the CDN with the goal of minimizing the time needed to deliver the content to the end user.

The traffic management servers 420 route end users, and more specifically, end user issued requests for content to one or more distribution servers that can optimally deliver the requested content back to the end users. Different CDN implementations utilize different traffic management schemes to achieve such routing. Anycast routing is one such traffic management scheme. It should be apparent that other traffic management schemes such as Domain Name System (DNS) routing can be used and that the traffic management servers 420 can include different combinations of DNS servers, load balancers, and routers performing Anycast or Border Gateway Protocol (BGP) routing.

The administrative server 430 may include a central server of the CDN or a distributed set of interoperating servers that perform the configuration control and reporting functionality of the CDN. Content providers register with the administrative server 430 in order to access services and functionality of the CDN. Accordingly, content providers are also referred to as customers of the CDN. Once registered, content providers can interface with the administrative server 430 to set security policies, designate content to be offloaded to the CDN for delivery, and view security and performance reports. The administrative server 430 also aggregates statistics data from each server of the set of distribution servers 410 and processes the statistics to produce usage and performance reports. From these reports, the content provider can better understand the demand for its content, the performance provided by the CDN in delivering the content provider's content, and the need for capacity reallocation, among other uses.

This distributed architecture enables the CDN to deliver content from the network edge. As a result, content is delivered with less latency, packet loss, etc. for a majority of end users than when that same content is delivered from more distant origin servers of a content provider. Moreover, the CDN can close any security vulnerabilities that exist in the content provider content by retrieving the vulnerable content from the content provider and modifying the security attributes before sending the content out to external recipients.

Many of the above-described processes and components are implemented as software processes that are specified as a set of instructions recorded on a non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 5:
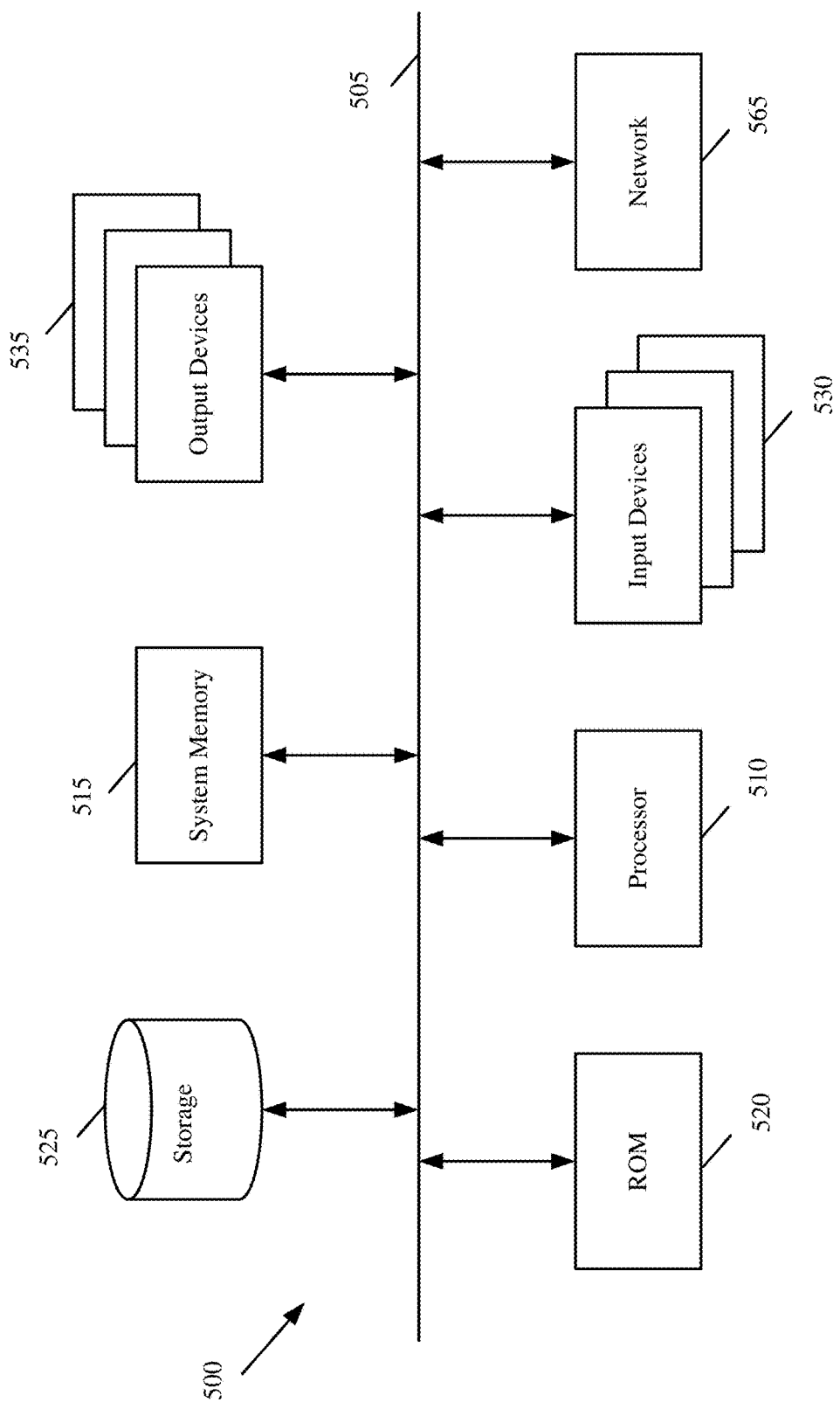
FIG. 5 illustrates a computer system or server with which some embodiments are implemented.

FIG. 5 illustrates a computer system or server with which some embodiments are implemented. Such a computer system includes various types of computer-readable mediums and interfaces for various other types of computer-readable mediums that implement the various methods and machines described above (e.g., distribution server). Computer system 500 includes a bus 505, a processor 510, a system memory 515, a read-only memory 520, a permanent storage device 525, input devices 530, and output devices 535.

The bus 505 collectively represents all system, peripheral, and chipset buses that communicatively connect the numerous internal devices of the computer system 500. For instance, the bus 505 communicatively connects the processor 510 with the read-only memory 520, the system memory 515, and the permanent storage device 525. From these various memory units, the processor 510 retrieves instructions to execute and data to process in order to execute the processes of the invention. The processor 510 is a processing device such as a central processing unit, integrated circuit, graphical processing unit, etc.

The read-only-memory (ROM) 520 stores static data and instructions that are needed by the processor 510 and other modules of the computer system. The permanent storage device 525, on the other hand, is a read-and-write memory device. This device is a non-volatile memory unit that stores instructions and data even when the computer system 500 is off. Some embodiments of the invention use a mass-storage device (such as a magnetic or optical disk and its corresponding disk drive) as the permanent storage device 525.

Other embodiments use a removable storage device (such as a flash drive) as the permanent storage device Like the permanent storage device 525, the system memory 515 is a read-and-write memory device. However, unlike storage device 525, the system memory is a volatile read-and-write memory, such as random access memory (RAM). The system memory stores some of the instructions and data that the processor needs at runtime. In some embodiments, the processes are stored in the system memory 515, the permanent storage device 525, and/or the read-only memory 520.

The bus 505 also connects to the input and output devices 530 and 535. The input devices enable the user to communicate information and select commands to the computer system. The input devices 530 include alphanumeric keypads (including physical keyboards and touchscreen keyboards), pointing devices. The input devices 530 also include audio input devices (e.g., microphones, MIDI musical instruments, etc.). The output devices 535 display images generated by the computer system. The output devices include printers and display devices, such as cathode ray tubes (CRT) or liquid crystal displays (LCD).

Finally, as shown in FIG. 5, bus 505 also couples computer 500 to a network 565 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 500 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

I claim:

1. A method comprising:
retrieving by a content distribution server, a packet encapsulating content of a particular content provider, wherein the particular content provider offloads said content to the content distribution server for delivery to a plurality of clients;
obtaining, in response to retrieving the packet, one or more of a first set of security options configured as default security options for two or more content providers, and a different second set of security options configured by the particular content provider;
verifying at the content distribution server, security of an original header of said packet based on one or more of the first set of security options and the different second set of security options, wherein a first security option of the second set of security options overrides a different value set for a similar security option in the first set of security options, and a second security option of the second set of security options sets a value for a security option not specified as part of the first set of security options;
modifying said packet with a modified header in response to changing said original header based on the original header violating at least one of the first set of security options and the second set of security options; and
serving the packet with the modified header to a client of the plurality of clients.

2. The method of claim 1 further comprising receiving a request from said client of the plurality of clients, the request comprising at least one of a domain name, Internet Protocol (IP) address, and Uniform Resource Locator (URL) directed to said content of the particular content provider.

3. The method of claim 2 further comprising selecting the second set of security options from different sets of security options configured by a plurality of content providers based on said domain name, IP address, or URL.

4. The method of claim 1, wherein said verifying comprises inspecting the original header of said packet.

5. The method of claim 1, wherein said modifying comprises changing a first security attribute of the original header, the method further comprising changing a different second security attribute of the original header based on the original header violating a default security option from the first set of security options, wherein the default security option is different than the security options of the second set of security options the particular content provider configures.

6. The method of claim 1, wherein the original header is generated by a server under control of the particular content provider and the modified header is generated by the content distribution server under control of an entity different than the particular content provider.

7. The method of claim 1, wherein said modifying comprises adding a new header field with a defined value to the original header.

8. The method of claim 1, wherein said modifying comprises removing from the modified header, a header field with a defined value that is present in the original header.

9. The method of claim 1, wherein said modifying comprising changing a particular header field having a first value in the original header to having a second value in the modified header.

10. A method comprising:
receiving a first set of security options from a first content provider, and a different second set of security options from a different second content provider;
receiving at a particular server, a first request for content of the first content provider, and a second request for content of the second content provider;

obtaining first and second packets in response to said first and second requests;

changing a particular field in a header of the first packet to a first value based on the first set of security options the particular server enforces on behalf of the first content provider;

changing the particular field in a header of the second packet to a different second value based on the second set of security options the particular server enforces on behalf of the second content provider, wherein the second set of security options specify a different security setting for the particular field than the first set of security options; and serving over a digital network, the first packet with a modified header comprising the first value for the particular field in response to the first request, and the second packet with a modified header comprising the second value for the particular field in response to the second request.

11. The method of claim 10 further comprising selecting the first set of security options from different sets of security options defined by a plurality of content providers based on said first request, and selecting the second set of security options from the different sets of security options based on said second request.

12. The method of claim 10 further comprising caching said first packet with the modified header at the particular server and serving said first packet with the modified header from cache without retrieval from the first content provider in response to a subsequent request for said content of the first content provider.

13. A security enforcement server comprising:

a network interface receiving a packet with an original header from a content provider and distributing said packet with a modified header to a requesting client;

a memory storing a set of security policies defined by said content provider, and providing a cache for locally storing copies of distributed packets;

a packet inspection module examining the original header of said packet in response to said receiving, and producing said modified header by modifying an attribute in said original header violating at least one of said set of security policies; and content cache within a portion of said memory, said content cache storing said packet with the modified header, wherein the security enforcement server subsequently distributes said packet with the modified header from the content cache directly in response to a subsequent request directed to the packet, the security enforcement server bypassing said examining and said producing by the packet inspection module in distributing said packet with the modified header from said content cache.

14. The security enforcement server of claim 13, wherein said memory further stores different sets of security policies defined by a plurality of content providers.

15. The security enforcement server of claim 14, wherein said packet inspection module selects said set of security policies from the different sets of security policies stored in memory based on at least one of IP addressing, domain name, or URL information in the original header.

16. The security enforcement server of claim 13, wherein said memory further stores a default set of security policies with one or more security policies not preset in said set of security policies defined by the content provider.

17. The security enforcement server of claim 16, wherein the packet inspection module further produces said modified header by modifying a different second attribute in said original header violating one of the default set of security policies not in present in said set of security policies defined by the content provider.

* * * * *